United States Patent [19]

Aguilera

[11] Patent Number: 5,666,261
[45] Date of Patent: Sep. 9, 1997

[54] HONEYCOMB CELLED-SHEET LAYER COMPOSITE PANEL FOR MONITORING AN LCD TO A LAPTOP COMPUTER

[75] Inventor: Rafael E. Aguilera, Simpsonville, S.C.

[73] Assignee: AT&T Global Information Solutions Company, Dayton, Ohio

[21] Appl. No.: 533,476

[22] Filed: Sep. 25, 1995

[51] Int. Cl.[6] .................... G06F 1/16; H05K 7/02; F28F 7/00; B32B 3/12
[52] U.S. Cl. .................... 361/681; 165/185; 428/116; 361/687
[58] Field of Search .................... 220/441–443; 165/185; 312/400, 223.2; 359/83; 428/116, 593, 118, 73, 117; 364/708.1; 361/680–683

[56] References Cited

U.S. PATENT DOCUMENTS

| | | | |
|---|---|---|---|
| 5,096,505 | 3/1992 | Fraas et al. | 136/246 |
| 5,182,158 | 1/1993 | Schaeffer | 428/178 |
| 5,196,993 | 3/1993 | Herron et al. | 361/681 |
| 5,264,992 | 11/1993 | Hogdahl et al. | 361/681 |
| 5,268,816 | 12/1993 | Abell, Jr. et al. | 361/681 |
| 5,349,893 | 9/1994 | Dunn | 89/36.05 |

Primary Examiner—Michael W. Phillips
Attorney, Agent, or Firm—Michael A. Kaufman

[57] ABSTRACT

A LCD in a laptop computer is resiliently mounted to a light-weight stiff celled composite sandwich panel that protects the LCD against breakage. The composite panel comprises a layer of lightweight preferably aluminum honeycomb celled material that is sandwiched between inner and outer sheets of graphite epoxy material. The carbon fibers comprising the graphite epoxy material have their axes parallel to a plane of the composite panel and exhibit a high strength modulus, whereas the axes of the honeycomb cells are normal to the plane of the composite panel. The LCD is mounted to the composite panel using vibration-isolated threaded fasteners, and/or using double-sided adhesive foam tape. In addition to providing an attachment surface for electronic printed circuit boards, the composite panel advantageously provides a large dissipation area for thermal management.

20 Claims, 4 Drawing Sheets

HONEYCOMB CELLED-SHEET LAYER COMPOSITE PANEL FOR MONITORING AN LCD TO A LAPTOP COMPUTER

FIELD OF THE INVENTION

The present invention relates generally to laptop computers, and more specifically to increasing durability of the computer in general and the display screen in particular.

BACKGROUND OF THE INVENTION

Many battery powered laptop computers weigh less than perhaps 6 pounds (13.2 Kg) and use a liquid crystal display ("LCD") screen. Typically, the laptop computer is contained within a clamshell-like housing, in which a lower housing portion containing the keyboard is hingedly attached to an upper housing portion containing the LCD.

FIG. 1A depicts a generic laptop computer 10 whose lower housing portion 20 contains a keyboard 30 and is coupled via a hinge mechanism 40 to an upper housing portion 50 that includes the liquid crystal display ("LCD") 60. Upper and lower housing portions 20 and 50 are commonly made from a light weight plastic material. Computer 10 further includes a central processing unit ("CPU") integrated circuit 70, random access and persistent storage memory, collectively shown as 80, and a battery 90 that powers the computer.

FIG. 1B is a cutaway topview showing details of prior art mounting of LCD 60 to the upper housing 50. As provided by its manufacturer, LCD 60 normally is attached to a plastic holder 100, and as used herein, the term LCD-assembly 110 shall refer collectively to holder 100 and LCD 60 per se. Damage to LCDs typically results from twisting of display 60 as a result of impact, falls, and the like. To minimize such twisting and damage, LCD assembly 110 is mounted to a rigid metal plate or shield 120, with screws 130. Metal plate 120 is commonly aluminum or steel.

Metal plate 120 in turn is mounted by screws 150 to the rear portion 140 of upper housing 150. Commonly, the front-facing portion 160 of upper housing 150 is joined to rear portion 140, and forms a frame about LCD 60.

Unfortunately, when the laptop computer is dropped or otherwise sufficiently severely stressed, upper housing 50 flexes, causing failure at screw(s) 150. As a result, metal plate 120 will flex, transferring the stress load to LCD assembly 110. The transferred stress, if sufficient in magnitude, twists and damages LCD 60. Such LCD damage can be reduced by adding to the strength of the upper housing 50, by providing a more rigid metal plate 120, by providing more mounting screws 150 and 130, and by providing a stronger LCD plastic holder 100, or any combination thereof. Unfortunately, implementing these options adds to the weight of the laptop computer, and can also increase the time and cost associated with assembly of the laptop computer.

In the past, LCD screens 60 commonly measured 9.5" (24 cm) diagonally. However, in an attempt to provide a larger, more readable and useful display, 10.4" (26 cm) screens are now used, and it is expected that 12.1" (31 cm) screens will soon become commonplace. Further, there is a trend away from the earlier monochrome LCD screens to more costly but easier to view passive and active color LCD screens.

Whether active or passive, a color LCD is costly and can represent a substantial portion of the manufacturing cost of the entire laptop computer. For example, a 10.4" (26 cm) active color LCD represents more than 75% of the total cost of the laptop computer. These screens, especially the larger sized screens, are vulnerable to breakage if the laptop computer is dropped or is otherwise mechanically stressed. If the LCD is damaged, as a practical matter the user-owner will probably replace the laptop computer outright rather than incur a nearly equal expense merely to replace the broken screen.

From the user's point of view, what is desired is a lightweight laptop with a large, active color LCD. However the prospective cost to replace the laptop computer in the event of LCD breakage causes many users to purchase laptops with smaller sized screens, or even with relatively inexpensive monochrome LCD screens. From the manufacturer's point of view, such purchase decisions are undesired because it is more profitable to produce and sell large-sized active color LCD laptops. Large-sized active color LCD laptops are also preferred from the software programmer's point of view, as such screens can more readily display more icon graphics, menus, and the like.

In an attempt to ruggedize the laptop computer, some manufacturers provide a housing 20, 50 made from metal, e.g., die cast magnesium. Metal enclosures can help protect the laptop and LCD screen from damage while the computer is stationary, e.g., from stress damage resulting from a heavy object placed atop the closed computer. However, if the computer is dropped, the additional weight and momentum resulting from the metal housing can actually increase the likelihood of LCD damage. Further, the additional weight and expense contributed by the metal housing makes the computer less desirable to consumers, who prefer lightweight, inexpensive, laptops.

Many manufacturers use plastic housing portions 20, 50, and stiffen the LCD-containing upper housing portion 50 using ribs or a stronger plastic. While less expensive than a metal housing, the resultant reinforced structure still adds weight to the laptop computer. For example, a rib-reinforced plastic-housed laptop computer with a 10.4" (26 cm) LCD weighs 5.5 about pounds. (2.5 Kg).

What is needed is a structure and method that decreases laptop computer weight, while providing a housing that better protects the LCD without incurring substantial manufacturing costs. Preferably, such housing should provide greater protection than present techniques, while simultaneously providing a weight savings.

The present invention discloses such a structure for a LCD laptop computer.

SUMMARY OF THE INVENTION

Durability of a laptop computer LCD is enhanced by resiliently mounting the LCD to a celled composite sandwich panel that is resiliently retained within the computer upper housing. Alternatively, the outer surface of the composite sandwich panel may itself serve as the outer surface of the computer upper housing. To further decrease weight, the laptop computer lower housing may also be fabricated from such composite panel material.

The composite panel comprises a layer of lightweight metal material that defines honeycomb-shaped cells, and is sandwiched between inner and outer sheets of stiff material, preferably a graphite epoxy material. Alternatively, the inner sheet of graphite epoxy may be omitted, in which case the celled material is sandwiched between the outer sheet of graphite epoxy and the rear surface of the LCD assembly.

The carbon fibers comprising the graphite epoxy material preferably have their axes parallel to the long axis of the composite panel, to further increase their strength and modulus of elasticity. The axes of the cells in the celled layer are normal to the plane of the graphite epoxy material. The resultant composite panel contributes great stiffness and strength to the computer and protects the LCD, but adds little weight. The increased strength/weight ratio provided by the panel advantageously reduces the design strength requirements of other portions of the computer housing.

The LCD preferably is mounted to the composite panel using vibration-isolated threaded fasteners, and/or using double-sided adhesive foam tape. The composite panel can provide an attachment surface for electronic printed circuit boards, including the LCD voltage inverter that powers the backlighting or sidelighting source that illuminates the display. Further, the composite panel advantageously provides a large dissipation area for thermal management.

Other features and advantages of the invention will appear from the following description in which the preferred embodiments have been set forth in detail, in conjunction with the accompanying drawings.

DETAILED DESCRIPTION OF THE PREFERRED EMBODIMENTS

Figure 1A:
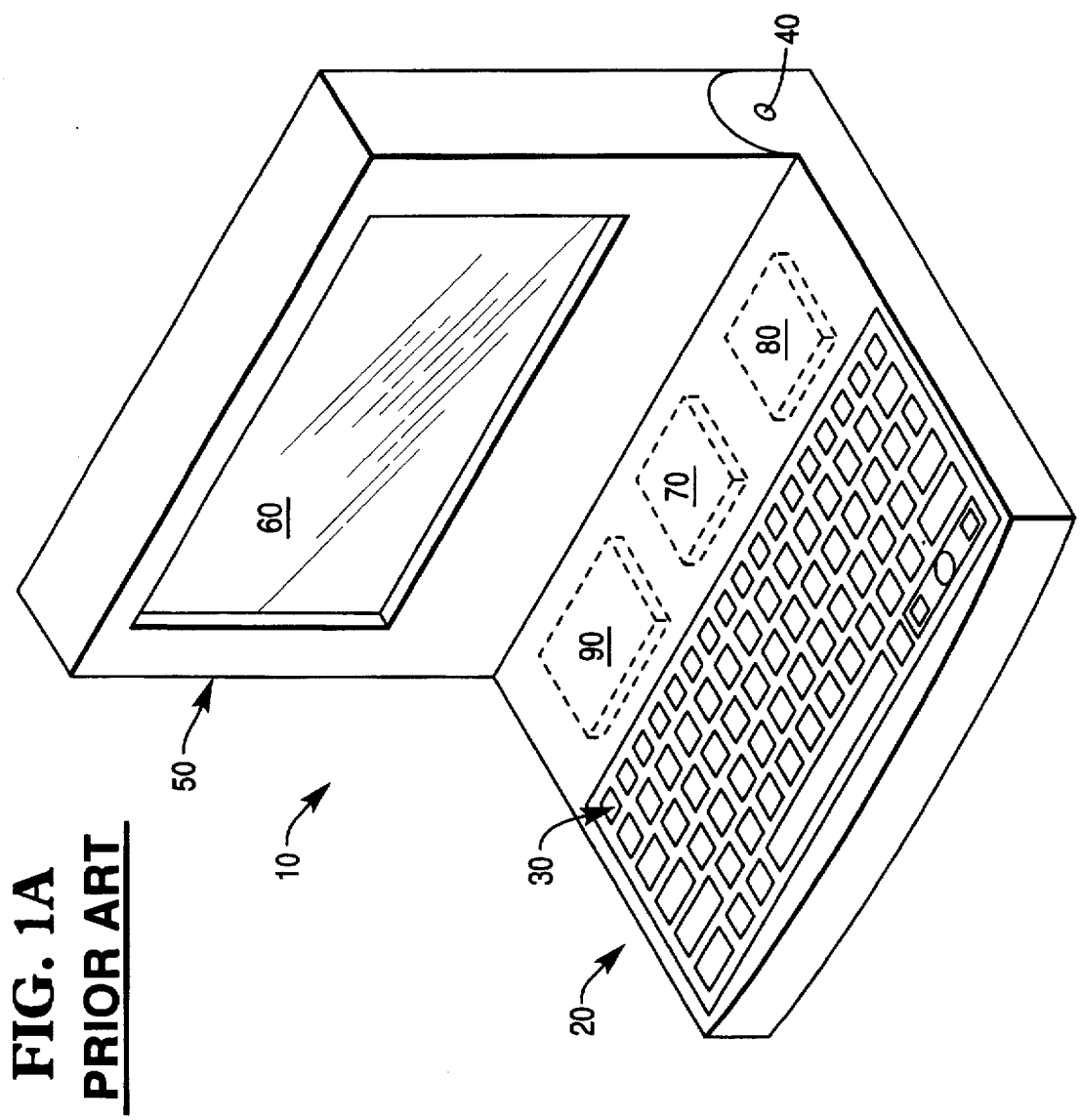
FIG. 1A depicts a generic laptop computer, according to the prior art.
Figure 1B:
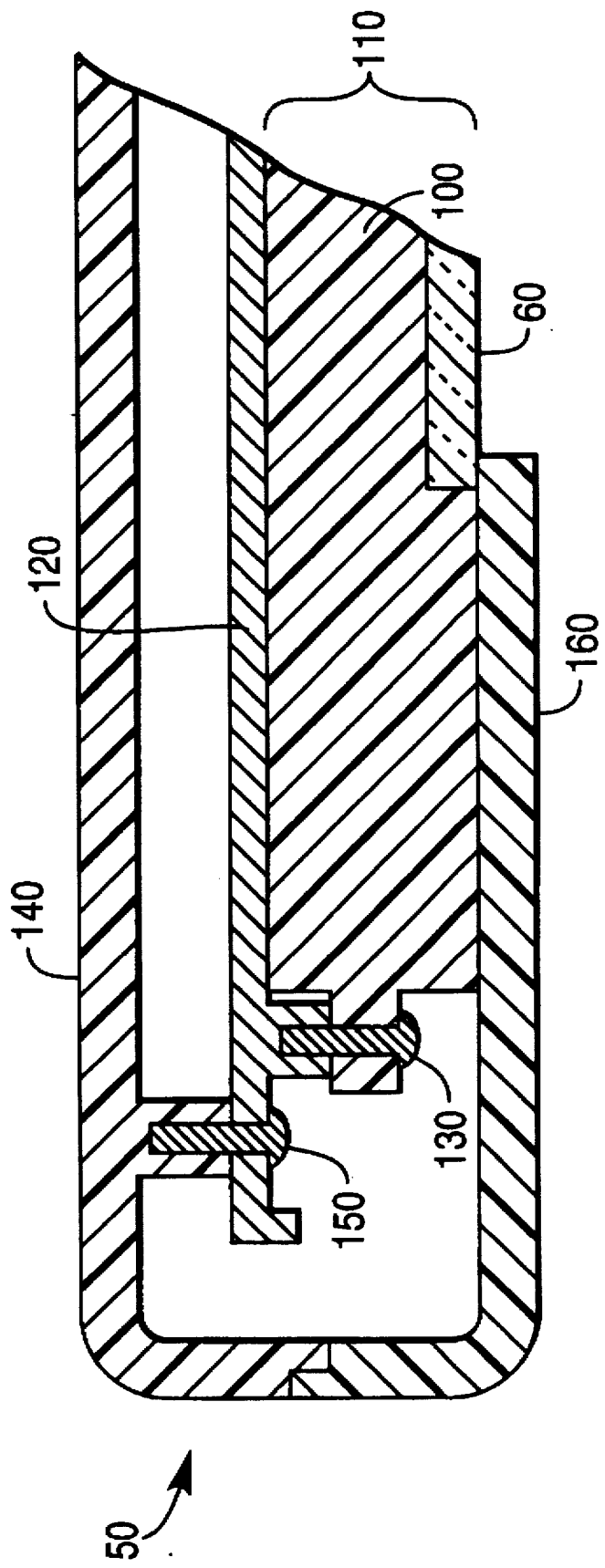
FIG. 1B is a breakaway top view of the upper housing portion of the laptop of FIG. 1A, depicting mounting of an LCD to a laptop, according to the prior art.
Figure 2A:
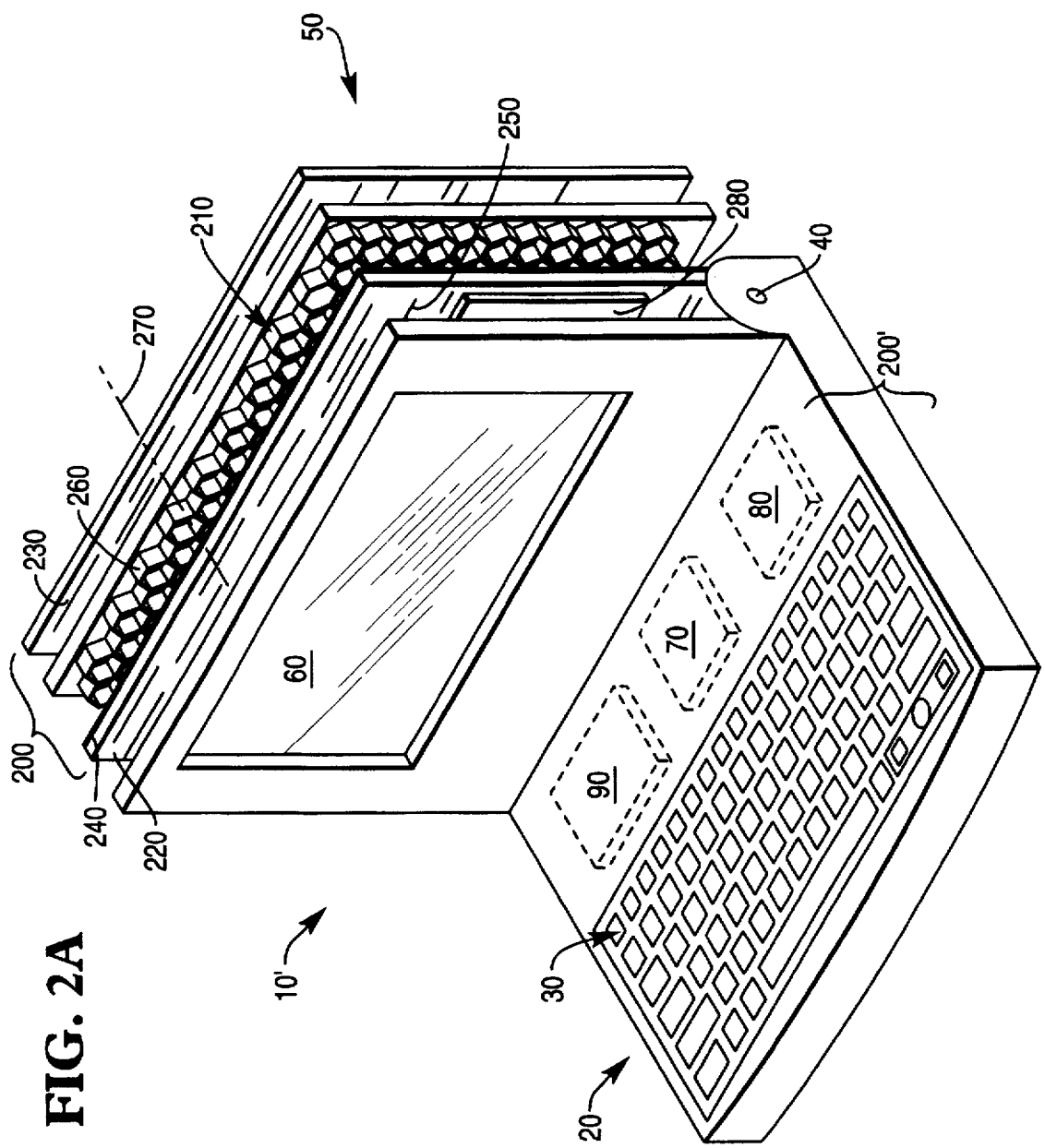
FIG. 2A depicts a laptop computer with a LCD mounted to a composite sandwich panel, and, optionally, with a lower housing portion fabricated from a composite sandwich panel, according to the present invention.

FIG. 2A depicts a laptop computer 10', according to the present invention. Computer 10' includes a lower housing portion 20 that includes a keyboard 30, and is coupled via a hinge mechanism 40 to an upper housing portion 50 that includes the liquid crystal display (LCD) 60. Computer 10' further includes a CPU 70, random access and persistent storage memory, collectively shown as 80, and a battery 90 that powers the computer.

Upper housing portion 50 includes a composite panel sandwich 200 that comprises a layer of celled material 210 that is sandwiched between front and rear layers 220, 230 of preferably graphite epoxy sheet material. Layer 210 contains a plurality of cells that preferably are honeycomb shaped in cross-section, although other shapes might also be used. Layers 220 and 230 carry shear loads in tension and, compression, while the cells within layer 210 carry a compression or so-called point load.

Optionally, a composite panel 200' that includes a layer of celled material sandwiched between layers of preferably graphite epoxy sheet material may also be used to fabricate the lower housing portion 20 of computer 10'. Use of such material for the lower housing portion 20 provides even greater weight savings, while increasing strength and durability of laptop computer 10', relative to use of a conventional plastic or metal housing portion 20.

Graphite epoxy material is preferred for layers 220, 230 as the associated modulus of elasticity is quite high (e.g., about six times that of steel), and the associated weight low. For example, epoxy graphite can withstand a stress of perhaps 600 million psi, whereas stainless steel can only withstand about 27 million psi, and titanium about 7 million psi. A given structural piece of epoxy graphite material may, however, cost three times more than a similar part fabricated from steel. By way of example, a 6"×10" (15.2 cm×25.4 cm) sheet of 0.125" thick (3 mm) epoxy graphite would weigh only 8 grams, and could not be bent by hand. Nonetheless, either or both of layers 220, 230 could be structural material other than epoxy graphite, titanium or aluminum, for example.

The rearmost surface of rear layer 230 may be used as the rear-most surface of the upper housing portion 50, or it may be covered with an overlayer of plastic or other material (not shown). If desired to further reduce weight, the LCD-facing graphite epoxy sheet 230 could be omitted, with the rearmost surface of LCD holder 100 being attached directly to the exposed cellular surface of celled material 210, using adhesive 240 or other joining mechanism.

Composite panel sandwich 200 may be purchased commercially from Dupont Composites, located in Delaware, with many options available as to material thicknesses, including thickness of epoxy graphite layers 220, 230, and the orientation of their fiber axes 250. As shown in FIG. 2A, the axes 250 of the graphite fibers comprising layers 220, 230 preferably are parallel to the long axis of the LCD 60. While this orientation does not provide optimum front-to-back thermal transfer characteristics, it does promote desired stiffness.

In the present application, the mounting of LCD 60 within the upper housing 50 of computer 10' was designed for an anticipated shock load of 400 g. Celled layer 210 preferably is formed from aluminum and is approximately 0.0200" (1.5 mm) to 0.08" (2 mm) thick, front-to-back, with a planar area at least as large as the area of LCD 60. Thus, where LCD screen measures 10.4" (26 cm) diagonally, layer 210 will have an area of at least 6" (15.2 cm)×9" (22.9 cm), or 54 inch$^2$ (348 cm$^2$).

Individual honeycombs 260 comprising celled layer 210 have a maximum transverse dimension across their opening of about 0.125" (3.2 mm) and the metal comprising their walls is about 0.002" (0.0508 mm) thick. Cells 260 define axes 270 that are normal to the planes of sheets 220, 230. Although the preferred embodiment used a layer 210 in which each cell was honeycomb shaped and substantially identically sized, a layer 210 containing differently sized cells, or indeed containing cells defining other than a honeycomb may instead be used. Material formed with honeycomb-shaped cells is commercially available from Dupont Composites of Delaware.

Aluminum is preferred for layer 210 because of its strength/weight ratio, and relatively good thermal conducting characteristics that help composite panel 200 dissipate heat. One source of heat is printed circuit board ("PCB") 280, which may be mounted on panel 200, on layer 220 or 230. PCB 280 preferably includes inverter circuitry. This circuitry steps-up the low operating voltage (e.g., 3.3 VDC to 5 VDC) used by the laptop computer to perhaps 6 VDC to 20 VDC required by the sidelight or backlight source of LCD illumination (not shown). If desired, PCB 280 could include CPU 70 as well as other circuitry normally found on a motherboard that is more conventionally mounted in lower housing portion 20.

In the preferred embodiment, graphite epoxy layers 230 and 240 each have a front-to-back thickness ranging from about 0.020" to 0.125" (0.5 mm to 3 mm), with 0.08" (2 mm) preferred for the designed 400 g shock load. The surface area of layers 230, 240 will approximate the area of the celled layer 210. Layers 220, 230, like celled layer 210 (and indeed composite panel 200) may be obtained commercially from Dupont Composites of Delaware.

Figure 2B:
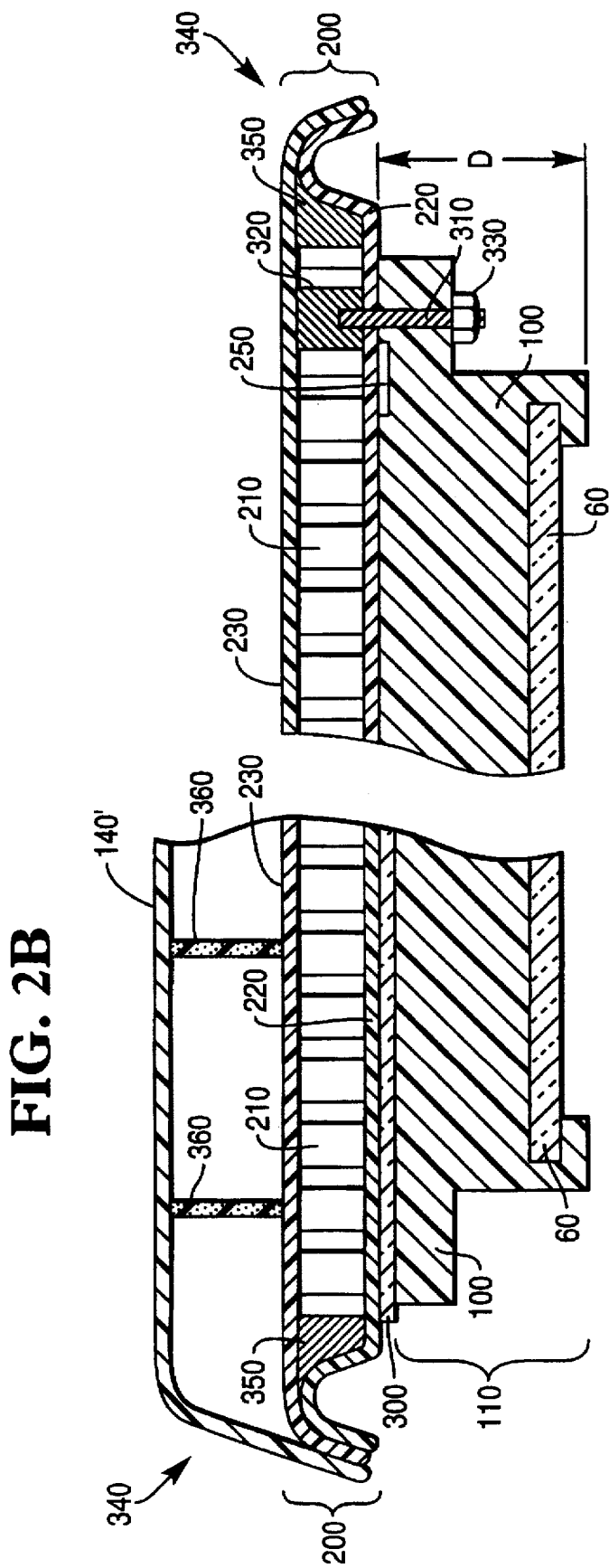
FIG. 2B is a cross-sectional view of an upper housing portion of a laptop computer, according to the present invention.

FIG. 2B depicts mounting of the LCD assembly 110, whose front-to-back dimension D is perhaps 0.3" (8 mm) to composite panel 200. As shown by the lefthand portion of FIG. 2B, LCD 60 and its associated housing 100 may be mounted to composite panel 200 using double-sided adhesive foam tape 300. As shown by the righthand portion of FIG. 2B, alternatively (or in addition), a vibration-isolated threaded post fastener 310 may be fitted into a hole 320 milled into panel 210 and used to mount LCD holder 100 with a locknut 330, or the like. Those skilled in the art will appreciate that other techniques may by used instead to mount the LCD assembly 110 to composite panel 200.

If desired, composite panel 200 may be curved in edge region 340 to provide a wrap-around cosmetic appearance, it being understood that the planar areas of sheets 220 and 230 need not be equal. In a wrap-around configuration, a foam filler material 350 may be used to fill any gaps between the curved sheets 220 and 230. If desired, the rearmost exposed area of sheet 230 may be painted and used as the outermost surface of laptop upper housing portion 50. Alternatively, as shown by the lefthand portion of FIG. 2B, composite panel 200 may be attached to a more conventional outermost upper laptop housing portion 140' using elastomeric shock isolation sleeves 360 and/or other mounting devices.

Eliminating housing portion 140' clearly can lighten the overall weight of laptop computer 10', the reliance being upon composite panel 200 to provide stiffness and strength to protect LCD 60. However, even if housing portion 140' is present, its thickness and/or strength requirements may be reduced because of the weight reduction and load carrying capacity provided by the composite panel 200.

A conventionally-housed 10.4" (264 mm) diagonal LCD laptop computer that weighs about 5.5 pounds (2.5 Kg) will weigh about 4.5 pounds (2 Kg) if the upper housing portion is fabricated as shown in FIG. 2A or 2B. Similarly, a prior art 11.3" (287 mm) diagonal LCD screen laptop computer weighing about 7.8 pounds (3.5 Kg) will weigh approximately 6.2 pounds (2.8 Kg) using a composite upper housing portion 200, according to the present invention.

It is anticipated that a 12.1" (307 mm) diagonal LCD laptop computer will weigh approximately 6.6 pounds (23.1 Kg) is fabricated with a composite upper housing portion according to the present invention. As a result of these weight reductions, should a laptop computer housed according to the present invention be dropped, less momentum and inertia will be developed and the LCD will be more likely to survive the fall without breakage or other costly damage.

The present invention has been described with respect to increasing the strength/weight ratio and ruggedness of a laptop computer. Those skilled in the art will appreciate however, that the use of one or more composite panels according to the present invention may be used to ruggedize other equipment as well, including without limitation portable computer printers, cellular telephones, and the like.

Modifications and variations may be made to the disclosed embodiments without departing from the subject and spirit of the invention as defined by the following claims.

What is claimed is:

1. A laptop computer having a liquid crystal display (LCD), including:
   a composite panel, comprising:
   a layer of celled material having spaced-apart first and second surfaces, the second surface being joined to a rear-facing surface of said LCD, said layer defining a plurality of cells having axes substantially normal to said first and second surfaces;
   a first sheet layer of substantially rigid material having first and second surfaces, the first surface of said first sheet layer being joined to said first surface of said layer of celled material; and
   means for mounting said composite panel to said LCD.

2. The laptop computer of claim 1, wherein said celled material has at least one characteristic selected from the group consisting of (i) said cells define a honeycomb shape in cross-section, (ii) said cells define a maximum transverse open dimension less than about 3 mm, (iii) said cells are defined by metal walls whose thickness is less than about 0.06 mm, (iv) said cells are defined by aluminum walls, (v) said cells have a front-to-back thickness ranging from about 1.5 mm to about 2 mm, and (vi) at least one of said first and second surfaces defines a plane having an area at least as large as a viewable area of said LCD.

3. The laptop computer of claim 1, wherein said first sheet layer includes graphite epoxy and has at least one characteristic selected from the group consisting of (i) a front-to-back thickness ranging from about 0.5 mm to about 3 mm, (ii) an orientation of axes of carbon fibers that is parallel to a plane of said sheet layer, and (iii) a planar area at least as large as a viewable area of said LCD.

4. The laptop computer of claim 1, wherein said means for mounting is selected from the group consisting of (i) vibration-isolated threaded post fasteners, and (ii) double-sided adhesive foam tape.

5. The laptop computer of claim 1, further including a second sheet layer of substantially rigid material having spaced-apart first and second surfaces, the first surface of said second sheet being joined to said second surface of said layer of celled material, and the second surface of said second sheet being joined to said rear-facing surface of said LCD.

6. The laptop computer of claim 5, wherein:
   at least one of said first sheet layer and said second sheet layer has at least one characteristic selected from the group consisting of (i) said substantially rigid material includes graphite epoxy, (ii) said substantially rigid material has a front-to-back thickness ranging from about 0.5 mm to about 3 mm, and (iii) said substantially rigid material includes graphite epoxy having carbon fibers whose axes are oriented parallel to a plane of said first or second sheet layer.

7. The laptop computer of claim 1, further including:
   a lower computer housing portion containing a keyboard; and
   an upper computer housing, hingedly attached to said lower computer housing;
   wherein said second surface of said first sheet layer of substantially rigid material defines an outermost surface of said upper computer housing.

8. The laptop computer of claim 1, further including a lower computer housing portion containing a keyboard; and
   an upper computer housing, hingedly attached to said lower computer housing;
   wherein said lower computer housing includes a second composite panel that includes:
   a second layer of material having spaced-apart upper and lower surfaces, and defining a plurality of cells having axes substantially normal to said upper and lower surfaces;

an upper sheet layer of graphite epoxy material attached to the upper surface of said second layer of material; and a lower sheet layer of graphite epoxy material attached to the lower surface of said second layer.

9. The laptop computer of claim 1, further including:

a lower computer housing portion containing a keyboard; and an upper computer housing, hingedly attached to said lower computer housing;

wherein said means for mounting attaches said composite panel to said upper computer housing.

10. A laptop computer having a liquid crystal display (LCD) mounted in an upper computer housing supporting the LCD and being hingedly attached to a lower computer housing that contains a keyboard, comprising:

a first composite panel including:
  a first layer of celled material having spaced-apart first and second surfaces, said first layer defining a plurality of cells having axes substantially normal to said first and second surfaces;
  a first sheet layer of graphite epoxy material attached to the first surface of said first layer of celled material;
  a second sheet layer of graphite epoxy material attached to the second surface of said first layer of celled material; and means for mounting said LCD to said composite panel.

11. The laptop computer of claim 10, wherein an outermost surface of said first sheet layer of graphite epoxy material comprises an outermost surface of said upper computer housing.

12. The laptop computer of claim 10, wherein at least one surface of said first composite panel has an area at least as large as a viewable area of said LCD.

13. The laptop computer of claim 10, wherein said lower computer housing comprises a second composite panel including:

a second layer of celled material having spaced-apart first and second surfaces, and defining a plurality of cells having axes substantially normal to said first and second surfaces of second layer;

a third sheet layer of graphite epoxy material attached to the first surface of said second layer of celled material; and a fourth sheet layer of graphite epoxy material attached to the second surface of said second layer of celled material.

14. The laptop computer of claim 13, wherein at least one of said first and second layer of celled material has at least one characteristic selected from the group consisting of (i) said cells define a honeycomb shape in cross-section, (ii) said cells define a maximum transverse open dimension less than about 3 mm, (iii) said cells are defined by metal walls whose thickness is less than about 0.06 mm, (iv) said cells are defined by aluminum walls, and (v) said cells have a front-to-back thickness ranging from about 1.5 mm to about 2 mm.

15. The laptop computer of claim 13, wherein at least one of the first, second, third and fourth sheet layer has at least one characteristic selected from the group consisting of (i) a front-to-back thickness ranging from about 0.5 mm to about 3 mm, and (ii) an orientation of axes of carbon fibers that is parallel to a plane of an associated said first, second, third or fourth said sheet layer.

16. The laptop computer of claim 13, wherein said means for mounting is selected from the group consisting of (i) vibration-isolated threaded post fasteners, and (ii) double-sided adhesive foam tape.

17. A method of mounting a liquid crystal display (LCD) to an upper housing of a laptop computer, the method including the following steps:

resiliently mounting said LCD to a composite panel that includes:
  a first layer of celled material having spaced-apart first and second surfaces, said first layer defining a plurality of cells having axes substantially normal to said first and second surfaces;
  a first sheet layer of graphite epoxy material attached to the first surface of said first layer of celled material; and
  a second sheet layer of graphite epoxy material attached to the second surface of said first layer of celled material; and mounting said composite panel to said upper housing of said laptop computer.

18. The method of claim 17, wherein resiliently mounting said LCD to said composite panel is carried out using at least one mounting device selected from the group consisting of (i) vibration-isolated threaded post fasteners, and (ii) double-sided adhesive foam tape.

19. The method of claim 17, wherein said celled material has at least one characteristic selected from the group consisting of (i) said cells define a honeycomb shape in cross-section, (ii) said cells define a maximum transverse open dimension less than about 3 mm, (iii) said cells are defined by metal walls whose thickness is less than about 0.06 mm, (iv) said cells are defined by aluminum walls, (v) said cells have a front-to-back thickness ranging from about 1.5 mm to about 2 mm, and (vi) at least one of said first and second surfaces defines a plane having an area at least as large as a viewable area of said LCD.

20. The method of claim 17, wherein at least one of said first and second sheet layer has at least one characteristic selected from the group consisting of (i) a front-to-back thickness ranging from about 0.5 mm to about 3 mm, (ii) an orientation of axes of carbon fibers that is parallel to a plane of said sheet layer, and (iii) a planar area at least as large as a viewable area of said LCD.

* * * * *

UNITED STATES PATENT AND TRADEMARK OFFICE
CERTIFICATE OF CORRECTION

PATENT NO.   : 5,666,261
DATED        : September 9, 1997
INVENTOR(S)  : Rafael E. Aguilera It is certified that error appears in the above-indentified patent and that said Letters Patent is hereby corrected as shown below:

On title page, item [54] and col. 1, line 2,
           delete "MONITORING" and substitute -- MOUNTING --.

Signed and Sealed this

Second Day of December,1997

Attest:

BRUCE LEHMAN

Attesting Officer        Commissioner of Patents and Trademarks